(12) United States Patent
Ann (10) Patent No.: US 9,809,221 B2
(45) Date of Patent: Nov. 7, 2017

(54) APPARATUS, METHOD, AND COMPUTER READABLE MEDIUM FOR DISPLAYING VEHICLE INFORMATION

(71) Applicant: Hyundai Motor Company, Seoul (KR)

(72) Inventor: Yun Sup Ann, Seoul (KR)

(73) Assignee: Hyundai Motor Company, Seoul (KR)

( * ) Notice: Subject to any disclaimer, the term of this patent is extended or adjusted under 35 U.S.C. 154(b) by 35 days.

(21) Appl. No.: 15/068,946

(22) Filed: Mar. 14, 2016

(65) Prior Publication Data

US 2016/0194004 A1    Jul. 7, 2016

Related U.S. Application Data

(62) Division of application No. 14/550,928, filed on Nov. 22, 2014.

(30) Foreign Application Priority Data

Aug. 27, 2014  (KR) ........................ 10-2014-0112415

(51) Int. Cl.
*B60T 7/12*       (2006.01)
*G05D 1/00*       (2006.01)
(Continued)

(52) U.S. Cl.
CPC ............. *B60W 30/16* (2013.01); *B60K 35/00* (2013.01); *B60K 2350/1084* (2013.01)

(58) Field of Classification Search
CPC   B60K 35/00; B60K 2350/1084; B60W 30/16
See application file for complete search history.

(56) References Cited

U.S. PATENT DOCUMENTS

| 6,658,344 B2 | 12/2003 | Hirasago |
| 2007/0124071 A1 | 5/2007 | Joo et al. |

(Continued)

FOREIGN PATENT DOCUMENTS

| JP | H0894756 A | 4/1996 |
| JP | H1096776 A | 4/1998 |

(Continued)

OTHER PUBLICATIONS

Notice of Allowance dated Jun. 22, 2016 in corresponding Korean Patent Application No. KR 10-2014-0112415.

*Primary Examiner* — Imran Mustafa (74) *Attorney, Agent, or Firm* — Mintz Levin Cohn Ferris Glovsky and Popeo, P.C.; Peter F. Corless (57) ABSTRACT

A method for displaying vehicle information includes: setting a driving velocity and an inter-vehicle distance after activating a smart cruise control function; performing a smart cruise control according to the set driving velocity and the set inter-vehicle distance and displaying smart cruise control-related information in an augmented reality display region located in a front portion of a driver's own vehicle; comparing an actual inter-vehicle distance between the driver's own vehicle and a nearby vehicle to the set inter-vehicle distance during performance of the smart cruise control; determining an information displayable region in the augmented reality display region when the actual inter-vehicle distance is less than the set inter-vehicle distance; and displaying display information corresponding to the set inter-vehicle distance in the information displayable region.

6 Claims, 6 Drawing Sheets

(51) Int. Cl.
*G06F 7/00* (2006.01)
*G06F 17/00* (2006.01)
*B60W 30/16* (2012.01)
*B60K 35/00* (2006.01)

(56) References Cited

U.S. PATENT DOCUMENTS

| | | | | |
|---|---|---|---|---|
| 2009/0079585 A1* | 3/2009 | Chinomi | ............ | B60R 1/00 340/901 |
| 2010/0253493 A1* | 10/2010 | Szczerba | ............ | G01S 13/723 340/435 |
| 2012/0224062 A1* | 9/2012 | Lacoste | ............ | G01C 21/365 348/148 |
| 2015/0019116 A1* | 1/2015 | Koshizen | ............ | G08G 1/163 701/117 |

FOREIGN PATENT DOCUMENTS

| | | |
|---|---|---|
| JP | 2002-219970 | 8/2002 |
| JP | 2002-274217 A | 9/2002 |
| JP | 4274111 B2 | 6/2009 |
| JP | 5327182 B2 | 10/2013 |
| KR | 10-0721560 | 5/2007 |
| KR | 10-2013-0059650 | 6/2013 |

\* cited by examiner

Fig.1

SET INTER-VEHICLE DISTANCE = 1STEP

SET INTER-VEHICLE DISTANCE = 2STEP

SET INTER-VEHICLE DISTANCE = 3STEP

SET INTER-VEHICLE DISTANCE = 4STEP

APPARATUS, METHOD, AND COMPUTER READABLE MEDIUM FOR DISPLAYING VEHICLE INFORMATION

CROSS-REFERENCE TO RELATED APPLICATION

This application is a divisional application of U.S. application Ser. No. 14/550,928, filed Nov. 22, 2014 which claims the benefit of and priority to Korean Patent Application No. 10-2014-0112415, filed on Aug. 27, 2014 in the Korean Intellectual Property Office, the disclosure of which is incorporated herein in its entirety by reference.

TECHNICAL FIELD

The present disclosure relates to an apparatus and a method for displaying vehicle information, and more particularly, to an apparatus and a method for displaying vehicle information relating to inter-vehicle distance information on a limited augmented reality display region of a head-up display (HUD) intended to be highly recognizable during a smart cruise control.

BACKGROUND

In general, a head-up display (HUD) mounted in a vehicle displays information which is necessary for driving the vehicle on a windshield glass of the vehicle. For example, the HUD displays vehicle information such as vehicle velocity, driving warnings, rear-side warnings, smart cruise control (SCC) information, lane keeping assist system (LKAS) information, and the like. Since a driver may directly check necessary driving information on the HUD while keeping his or her eyes forward (e.g., directed toward the road), the driver may minimize eye movement, thereby improving driving stability.

A conventional head-up display may implement augmented reality (AR) by outputting a nearby vehicle mark representing a nearby vehicle (e.g., a vehicle in front of, behind, to the side of, or otherwise proximate to a driver's own vehicle) sensed by the smart cruise control system, as well as an inter-vehicle distance mark representing an inter-vehicle distance between the nearby vehicle and the driver's own vehicle, so as to overlap real objects on a screen. Conventionally, when a smart cruise control function is activated and a driver then sets an inter-vehicle distance, if an actual distance between the own vehicle and the nearby vehicle is longer than the set inter-vehicle distance, there is no problem with displaying the inter-vehicle distance information on augmented reality display region of the HUD.

However, according to the related art, if the actual distance between the own vehicle and the nearby vehicle is smaller than the set inter-vehicle distance, the inter-vehicle distance information may not be displayed on the augmented reality display region. In this case, the fact that the set inter-vehicle distance is larger than the actual distance has been conventionally displayed by displaying a step within a displayable inter-vehicle distance information range on the augmented reality display region and giving a blinking effect to a trapezoidal shape which is the most distant from the own vehicle. However, it is difficult for drivers to clearly understand whether the above-mentioned blinking effect exhibits a difference between the actual inter-vehicle distance and the set inter-vehicle distance. In addition, according to the related art, if a position of the nearby vehicle moves beyond the augmented reality display region, it is difficult to display the inter-vehicle distance from the nearby vehicle, even in the case in which the inter-vehicle distance is set.

SUMMARY

An aspect of the present disclosure provides an apparatus and a method for displaying vehicle information relating to inter-vehicle distance information on a limited augmented reality display region of a head-up display (HUD) intended to be highly recognizable during a smart cruise control.

According to embodiments of the present disclosure, a method for displaying vehicle information includes: setting a driving velocity and an inter-vehicle distance after activating a smart cruise control function; performing a smart cruise control according to the set driving velocity and the set inter-vehicle distance and displaying smart cruise control related-information in an augmented reality display region located in a front portion of a driver's own vehicle; comparing an actual inter-vehicle distance between the driver's own vehicle and a nearby vehicle to the set inter-vehicle distance during performance of the smart cruise control; determining an information displayable region in the augmented reality display region when the actual inter-vehicle distance is less than the set inter-vehicle distance; and displaying display information corresponding to the set inter-vehicle distance in the information displayable region.

The checking of the information displayable region may include: detecting a nearby vehicle region from a front image obtained by a front camera, and extracting the information displayable region, which is capable of displaying the display information, except for a region corresponding to the nearby vehicle region, and a nearby vehicle indication information display region from the augmented reality display region.

In the displaying of the display information, the display information may be scaled depending on a size of the information displayable region.

The method may further include: checking whether or not the nearby vehicle is outside of the augmented reality display region when the actual inter-vehicle distance is equal to or greater than the set inter-vehicle distance, and processing and displaying perspective information for the display information corresponding to the set inter-vehicle distance when the preceding vehicle is outside of the augmented reality display region.

The processing and displaying of the perspective information may include: measuring driving velocity of the nearby vehicle, checking whether or not the driving velocity of the nearby vehicle is slower than the set driving velocity, and processing the perspective information for the display information when the driving velocity of the nearby vehicle is less than the set driving velocity.

The method may further include stopping the displaying of the display information when the driving velocity of the preceding vehicle is greater than the set driving velocity.

In the processing of the perspective information, the perspective information for the display information may be processed based on a vehicle width of the nearby vehicle in a front image obtained by a front camera.

When the actual inter-vehicle distance is equal to the set inter-vehicle distance, color of the display information may be changed.

According to embodiments of the present disclosure, an apparatus for displaying vehicle information includes: a front camera configured to photograph a front image of a vehicle; an inter-vehicle distance detector configured to measure an inter-vehicle distance between the vehicle and a nearby vehicle; a vehicle information detector configured to detect vehicle information associated with the vehicle; a smart cruise control system configured to control a smart cruise control of the vehicle using the inter-vehicle distance and the vehicle information; a display configured to display information relating to the smart cruise control in an augmented reality display region of the vehicle; and a controller configured to: i) compare an actual inter-vehicle distance between the driver's own vehicle and a nearby vehicle, which is measured by the inter-vehicle distance detector, to a set inter-vehicle distance which is preset and ii) output display information corresponding to the set inter-vehicle distance to the display based on the comparison.

The controller may be further configured to: i) extract an information displayable region in the augmented reality display region that is capable of displaying the display information when the actual inter-vehicle distance is less than the set inter-vehicle distance and ii) display the display information in the extracted information displayable region.

The controller may be further configured to extract the information displayable region by excepting a nearby vehicle region from the augmented reality display region using the front image and excepting a region displaying nearby vehicle indication information indicating the nearby vehicle.

The controller may be further configured to scale the display information based on a size of the information displayable region.

The controller may be further configured to: i) check whether or not the nearby vehicle is outside of the augmented reality display region using the front image when the actual inter-vehicle distance is equal to or greater than the set inter-vehicle distance and ii) determine whether or not the display information is displayed based on a driving velocity of the nearby vehicle when the nearby vehicle is outside of the augmented reality display region.

The controller may be further configured to process perspective information for the display information based on a vehicle width of the nearby vehicle in the front image when the driving velocity of the nearby vehicle is slower than the set driving velocity.

The controller may be further configured to stop the outputting of the display information when the driving velocity of the nearby vehicle is greater than the set driving velocity.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, embodiments of the present disclosure will be described in detail with reference to the accompanying drawings.

Thorough the specification, unless explicitly described to the contrary, the word "comprise" and variations such as "comprises" or "comprising", will be understood to imply the inclusion of stated elements but not the exclusion of any other elements.

In addition, the terms "-er", "-or", "module", and the like described in the specification mean units for processing at least one function and operation, and can be implemented by hardware, software, or combinations thereof. In addition, "a or an", "one", "the" and similar related words may be used to include both singular forms and plural forms unless the context clearly indicates otherwise, in the context (particularly, in the context of the following claims) describing the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Additionally, it is understood that the below methods may be executed by at least one controller. The term "controller" refers to a hardware device that includes a memory and a processor. The memory is configured to store program instructions, and the processor is configured to execute the program instructions to perform one or more processes which are described further below. Moreover, it is understood that the below methods may be executed by an apparatus comprising the controller, whereby the apparatus is known in the art to be suitable for displaying vehicle information relating to inter-vehicle distance information on an augmented reality display region of a head-up display intended to be highly recognizable during a smart cruise control.

Furthermore, the controller of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Specific terms used in embodiments of the present disclosure are provided to help understandings of the present disclosure. The use of the specific terms may be changed into other forms without departing from the technical idea of the present disclosure.

The present disclosure relates to an augmented reality head-up display (AR-HUD) which displays display information relating to a nearby vehicle (e.g., a vehicle in front of, behind, to the side of, or otherwise proximate to a driver's own vehicle) which is sensed by a smart cruise control system on a reality screen which is watched by a driver's eye, where the display information overlaps the reality screen. Here, the display information includes a nearby vehicle indication (e.g., a mark or the like), an actual inter-vehicle distance between a nearby vehicle and an own vehicle, a set inter-vehicle distance, a set driving velocity, and the like, and is displayed in a form of an image, an icon, a figure, a symbol, a text, a graphic, or the like.

Figure 1:
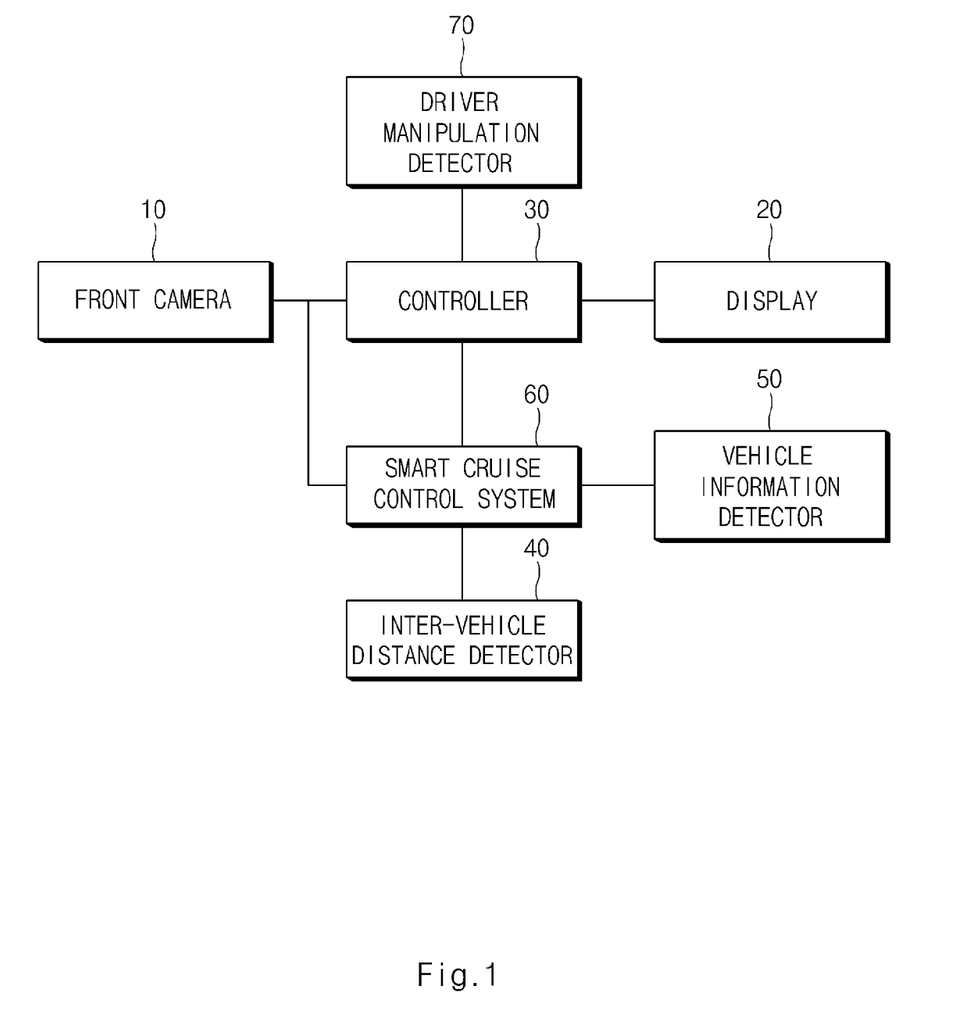
FIG. 1 is a block configuration diagram of an apparatus for displaying vehicle information according to embodiments of the present disclosure.
Figure 2:
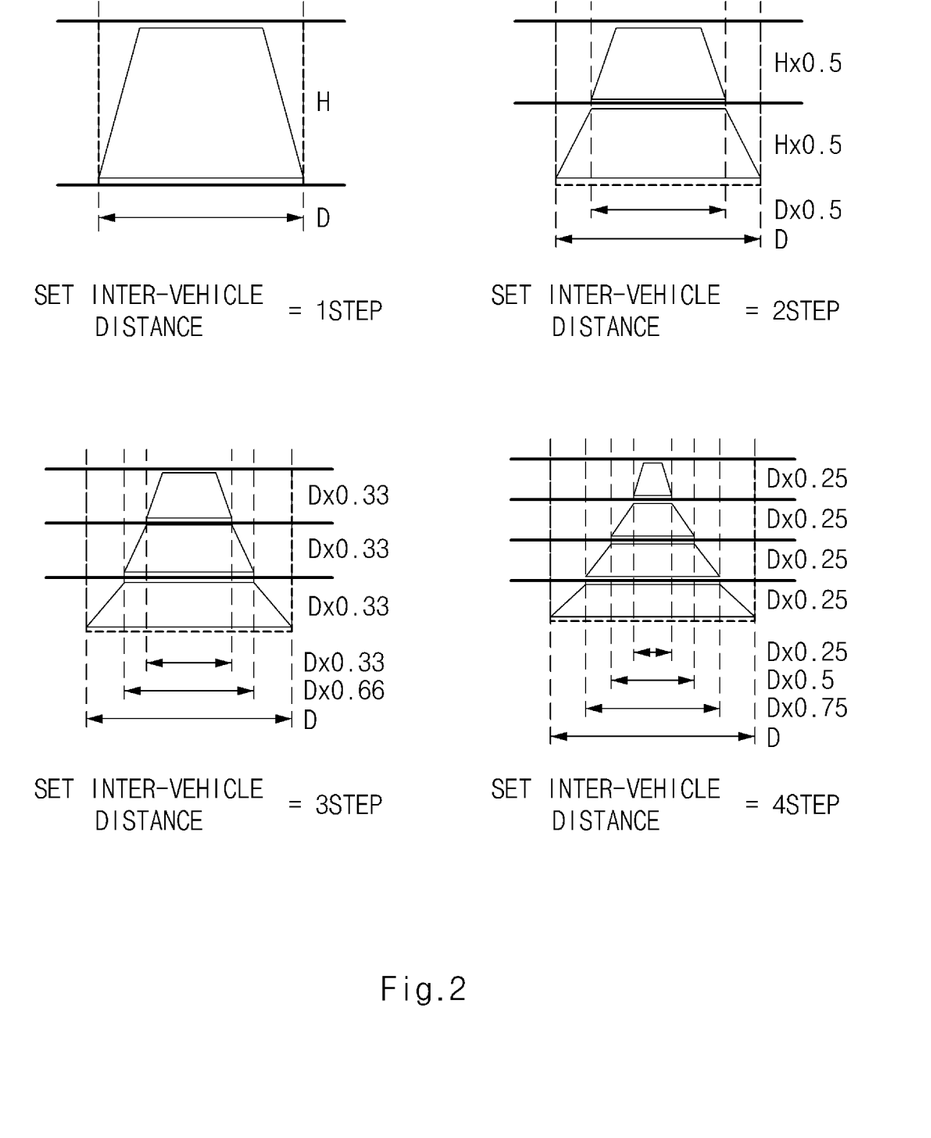
FIG. 2 is an illustrative view showing display information for each set inter-vehicle distance step according to embodiments of the present disclosure.
Figure 3:
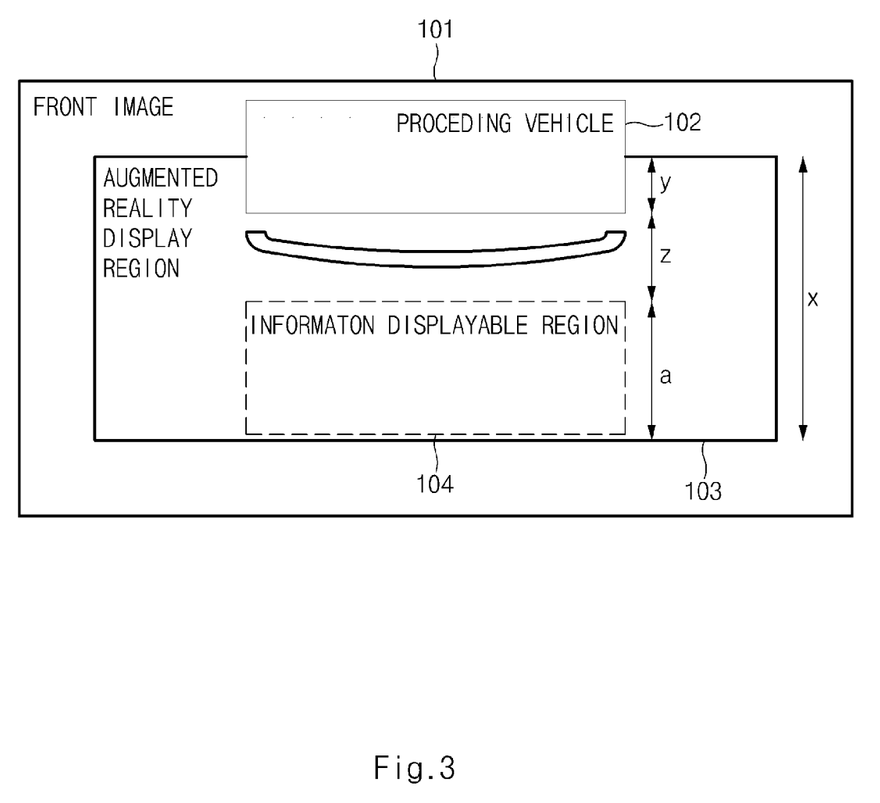
FIG. 3 is a diagram for describing a method for extracting information displayable region according to embodiments of the present disclosure.

FIG. 1 is a block configuration diagram of an apparatus for displaying vehicle information according to embodiments of the present disclosure, FIG. 2 is an illustrative view showing display information for each set inter-vehicle distance step according to embodiments of the present disclosure, and FIG. 3 is a diagram for describing a method for extracting information displayable region according to embodiments of the present disclosure.

Referring to FIG. 1, the apparatus for displaying vehicle information includes a front camera 10, a display 20, a controller 30, an inter-vehicle distance detector 40, a vehicle information detector 50, a smart cruise control system 60, a driver manipulating detector 70, and the like. The front camera 10 is mounted on a front of a vehicle and photographs a front image of the vehicle. The display 20 displays vehicle information which is necessary for driving the vehicle on a windshield glass of the vehicle. Here, the vehicle information includes a nearby vehicle mark sensed by the smart cruise control system 60, an actual inter-vehicle distance between the nearby vehicle and the driver's own vehicle (the nearby vehicle may preferably be following the driver's own vehicle), operation information (set or release) of the smart cruise control system 60, a set inter-vehicle distance, a set driving velocity, an actual driving velocity, a driving road information (e.g., a straight road, a curved road, an expressway, a general road, and the like), a fuel amount, and the like.

In addition, the display 20 is implemented as the augmented reality head-up display (AR-HUD) by overlapping and displaying the vehicle information on the reality screen which is watched by the driver's eye. A display screen of the display 20 includes augmented reality display region in which nearby vehicle information is displayed in augmented reality. The augmented reality display region has a predetermined region allocated into the display screen of the augmented reality head-up display and is a region for displaying information in augmented reality. The augmented reality display region is an eyebox through which the driver may clearly watch an image displayed by the augmented reality head-up display.

The controller 30 sets setting information relating to smart cruise control according to data (i.e., information) which is input through the driver manipulation detector 70. Here, the setting information is the driving velocity and an inter-vehicle between the own vehicle and the nearby vehicle. In addition, the controller 30 transmits the setting information which is set by the driver to the smart cruise control system 60.

The controller 30 displays information relating to the smart cruise control (i.e., smart cruise control related information) on the augmented reality display region during the smart cruise control. Here, the information relating to the smart cruise control includes the nearby vehicle indication information, the inter-vehicle distance between the set own vehicle and the nearby vehicle, and the like.

The controller 30 matches coordinates between the front image transmitted from the front camera 10 and the augmented reality display region in order to display information using the augmented reality. In addition, the controller 30 detects the nearby vehicle from the front image and checks a position of the detected nearby vehicle (i.e., a corresponding coordinate value in the augmented reality display region). The controller 30 displays the nearby vehicle indication information indicating the nearby vehicle at one side end portion of the nearby vehicle on the augmented reality display region based on the checked position of the nearby vehicle.

The controller 30 differently displays display information according to the set inter-vehicle distance (i.e., set inter-vehicle distance display information). For example, as shown in FIG. 2, in the case in which the set inter-vehicle distance may be set in four steps, if the set inter-vehicle distance is one step, it is displayed by one trapezoidal figure, and as the step of the set inter-vehicle distance is increased, the number of trapezoidal figures is increased. That is, if the set inter-vehicle distance is changed to a two step, a three step, and a four step, the number of trapezoidal figures is increased by one.

In this case, a size (e.g., horizontal length×vertical length) of a set shape (e.g., a trapezoid) that constitutes the display information according to the set inter-vehicle distance and an interval between the shapes set a reference value by a ratio (e.g., see FIG. 2). That is, the size of the set shape and the interval between the shapes are determined according to a size (e.g., D×H) of the information displayable region in the augmented reality display region.

The controller 30 compares the actual inter-vehicle distance between the nearby vehicle and the driver's own vehicle to the set inter-vehicle distance, and performs a data process for the display information corresponding to the set inter-vehicle distance according to the comparison result and displays it in the augmented reality display region.

The controller 30 detects a region which is occupied by the nearby vehicle from the front image obtained by the front camera 10, when the actual inter-vehicle distance is less than the set inter-vehicle distance. In addition, the controller 30 extracts the information displayable region capable of displaying the display information from the augmented reality display region based on the nearby vehicle region detected from the front image. In addition, the controller 30 extracts a region excepting for the nearby vehicle region and the nearby vehicle indication display region which are extracted from the front image, as the information displayable region. As shown in FIG. 3, the controller 30 calculates a vertical length a of an information displayable region 104 by subtracting a vertical length y of an overlapped region of a nearby region 102 of a front image 101 and an augmented reality display region 103, and a vertical length z of a region in which the nearby vehicle indication information is displayed, from a vertical length x of the augmented reality display region 103. Here, the vertical length z of the region in which the nearby vehicle indication information is displayed and the vertical length x of the augmented reality display region 103 are fixed variables.

The controller 30 scales the display information corresponding to the set inter-vehicle distance based on a size of the extracted information displayable region. Meanwhile, if the actual inter-vehicle distance is equal to or greater than the set inter-vehicle distance, the controller 30 checks whether or not the nearby vehicle gets out of the augmented reality display region (i.e., whether or not it leaves the augmented reality display region) using the front image.

If it is checked that the nearby vehicle gets out of the augmented reality display region, the controller 30 compares a driving velocity of the nearby vehicle and a set driving velocity with each other and displays set inter-vehicle distance information according to the comparison result.

If the driving velocity of the nearby vehicle is slower than the set driving velocity, the controller 30 processes and displays perspective (i.e., perspective information) for the set inter-vehicle distance display information. In this case, the controller 30 adjusts the perspective depending on the inter-vehicle distance between the own vehicle and the nearby vehicle.

The inter-vehicle distance detector 40 measures a distance between the nearby vehicle (e.g., the vehicle following the driver's own vehicle, etc.) positioned at the front and the own vehicle using a radar sensor, an infrared sensor, a lidar sensor, or the like. The inter-vehicle distance detector 40 is used to monitor whether or not the distance between the own vehicle and the nearby vehicle is kept to be constant during the smart cruise control. In addition, the inter-vehicle distance detector 40 may calculate the driving velocity of the nearby vehicle by measuring a time taken when a radar waveform arrives at the nearby vehicle and is then returned back.

The vehicle information detector 50 detects vehicle information such as stability and velocity of the vehicle (i.e., the driver's own vehicle) using a variety of sensors which are installed in the vehicle. Here, the variety of sensors include a gyro sensor, a yaw rate sensor, a steering angle sensor, a wheel velocity sensor, a vehicle velocity sensor, and the like. The vehicle information detector 50 is connected to the sensor through a controller area network (CAN) bus interface.

The smart cruise control system 60 controls a drive of the own vehicle based on information provided from the inter-vehicle distance detector 40 and the vehicle information detector 50. The smart cruise control system 60 controls an operation of a braking apparatus or a driving apparatus of the own vehicle so as to be driven at the set driving velocity once the nearby vehicle to be followed is sensed and the set inter-vehicle distance from the sensed nearby vehicle is kept. The driver manipulation detector 70 detects information (e.g., the smart cruise control system setting/releasing instruction, setting information of the distance between the nearby vehicle and the own vehicle, and the driving velocity, and the like) which is input according to driver manipulation.

The apparatus for displaying vehicle information includes a memory (not shown) in which a variety of data such as data generated according to an operation of the apparatus for displaying vehicle information, reference data, the vehicle information, the setting information, and the like are stored.

Figure 4:
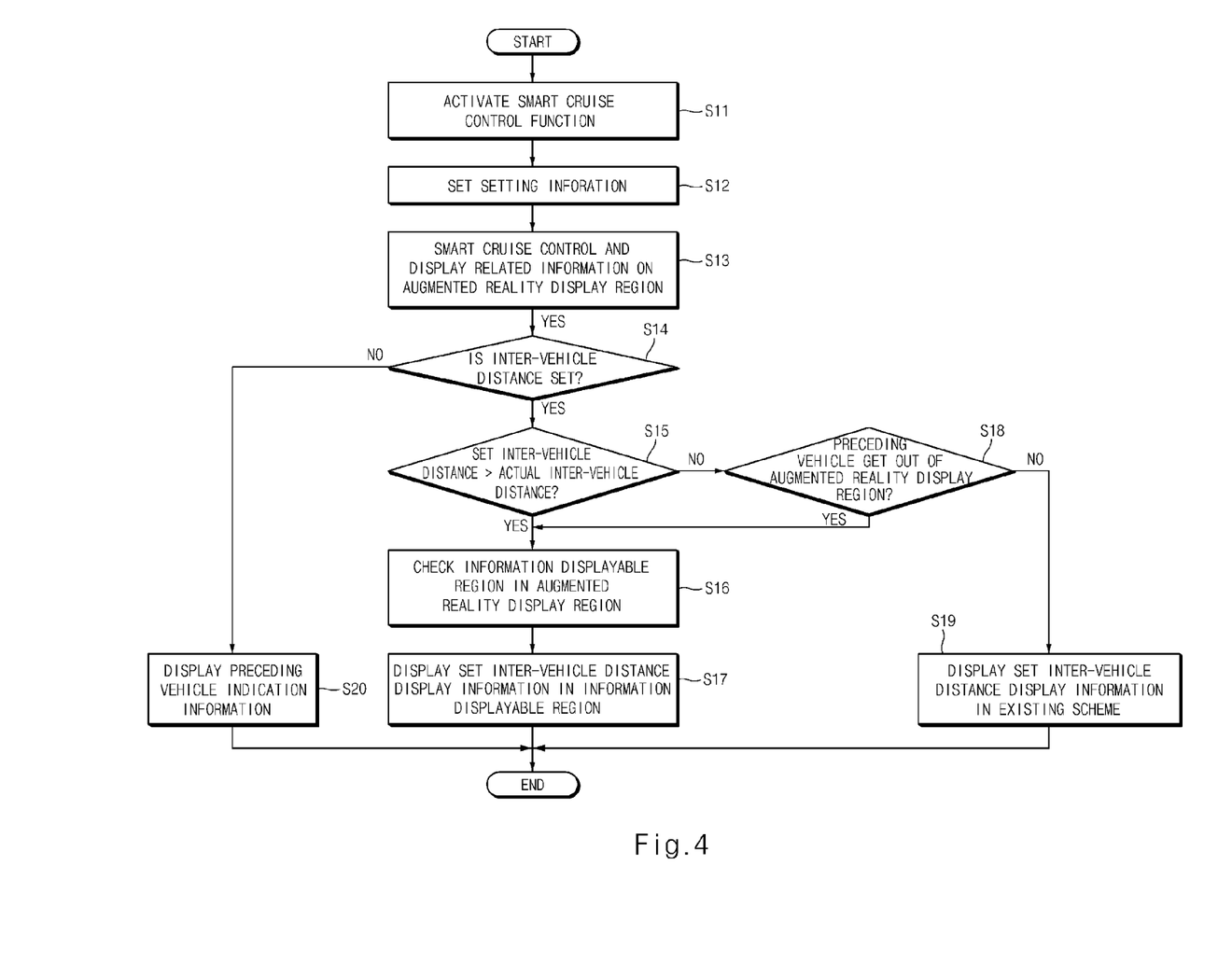
FIG. 4 is a flow chart showing a method for displaying vehicle information according to embodiments of the present disclosure.

FIG. 4 is a flow chart showing a method for displaying vehicle information according to embodiments of the present disclosure.

First, the controller 30 activates the smart cruise control function in response to the driver manipulation (S11). Here, if the driver presses a smart cruise control function operation/release button, the controller 30 operates (i.e., activates) or releases (i.e., deactivates) the smart cruise control system 60 in response to the button press.

The controller 30 activates the smart cruise control function and then sets the setting information relating to the smart cruise control (S12). For example, the controller 30 sets the driving velocity and/or the inter-vehicle distance according to data input from the driver manipulation detector 70.

The controller 30 transmits the setting information to the smart cruise control system 60 to allow the smart cruise control system 60 to control the smart cruise control of the own vehicle according to the setting information and displays related information relating to the smart cruise control on the augmented reality display region (S13). That is, the smart cruise control system 60 controls the drive of the own vehicle so that the inter-vehicle distance and the driving velocity which are measured by the inter-vehicle distance detector 40 and the vehicle information detector 50 are matched to the set inter-vehicle distance and the set driving velocity. In addition, the controller 30 displays the nearby vehicle indication information and the inter-vehicle distance which is set (i.e., set inter-vehicle distance) on the augmented reality display region of the display 20 in a graphic form.

The controller 30 checks whether or not the inter-vehicle distance is set, using the setting information (S14). In other words, the controller 30 checks whether or not the set inter-vehicle distance is included in the setting information (S14).

If the inter-vehicle distance is set, the controller 30 compares the actual inter-vehicle distance between the own vehicle and the nearby vehicle with the set inter-vehicle distance (S15). In this case, the smart cruise control system 60 transmits the actual inter-vehicle distance which is measure by the inter-vehicle distance detector 40 to the controller 30. The controller 30 checks whether or not the actual inter-vehicle distance provided from the smart cruise control system 60 is less than the set inter-vehicle distance.

If the actual inter-vehicle distance is less than the set inter-vehicle distance, the controller 30 checks the information displayable region in the augmented reality display region (S16). That is, if the actual inter-vehicle distance is less than the set inter-vehicle distance, the controller 30 extracts the information displayable region capable of displaying the smart cruise control related information from the augmented reality display region using the front image.

The controller 30 displays the display information corresponding to the set inter-vehicle distance on the information displayable region (S17). As the comparison result obtained by comparing the actual inter-vehicle distance with the set inter-vehicle distance, if the actual inter-vehicle distance is equal to or greater than the set inter-vehicle distance, the controller 30 checks whether or not the nearby vehicle gets out of the augmented reality display region using the front image (S18). In this case, the controller 30 detects the nearby vehicle from the front image and checks the position (e.g., coordinate) of the detected nearby vehicle to thereby check whether or not the nearby vehicle gets out of the augmented reality display region. If the nearby vehicle is outside of the augmented reality display region, the controller 30 checks the information displayable region in the augmented reality display region and displays the set inter-vehicle distance display information on the checked information displayable region (S16, S17).

The controller 30 checks whether or not the information displayable region has a size capable of displaying the set inter-vehicle distance display information having a default size. If the default size of the set inter-vehicle distance display information exceeds the size of the information displayable region, the controller 30 scales the set inter-vehicle distance display information based on the size of the information displayable region.

Meanwhile, if the actual inter-vehicle distance is the set inter-vehicle distance or more and the nearby vehicle gets out of the augmented reality display region, the controller 30 processes perspective for the set inter-vehicle distance display information and displays the set inter-vehicle distance display information which is subjected to the perspective process on the information displayable region. The controller 30 processes the prospective for the set inter-vehicle distance display information based on the actual inter-vehicle distance, a vehicle width of the nearby vehicle which is extracted from the front image, or the like.

In this case, the controller 30 may stop displaying of the set inter-vehicle distance display information depending on the comparison result of the driving velocity of the nearby vehicle and the set driving velocity. In other words, the controller 30 measures the driving velocity of the nearby vehicle using the inter-vehicle distance detector 40, and compares the measured driving velocity of the nearby vehicle with the set driving velocity of the own vehicle. If the driving velocity of the nearby vehicle is less than the set driving velocity, the controller 30 outputs the set inter-vehicle distance display information, and if the driving velocity of the nearby vehicle is greater than the set driving velocity, the controller 30 stops displaying of the set inter-vehicle distance display information. In the case in which the driving velocity of the nearby vehicle is greater than the set driving velocity, since the distance between the driver's own vehicle and the nearby vehicle is gradually increased and the nearby vehicle is unlikely to enter the augmented reality display region, there is no sense in displaying the set inter-vehicle distance. Therefore, the controller 30 stops outputting of the display information indicating the set inter-vehicle distance and controls the smart cruise control system 60 to thereby control the own vehicle to be driven at the set driving velocity.

Meanwhile, if the actual inter-vehicle distance is the set inter-vehicle distance or more and the nearby vehicle is not outside of the augmented reality display region, the controller 30 displays the set inter-vehicle distance display information on the augmented reality display region according to an existing scheme (S19). Meanwhile, if the inter-vehicle distance is not set when setting the setting information, the controller 30 displays only the nearby vehicle indication information (S20).

Figure 5:
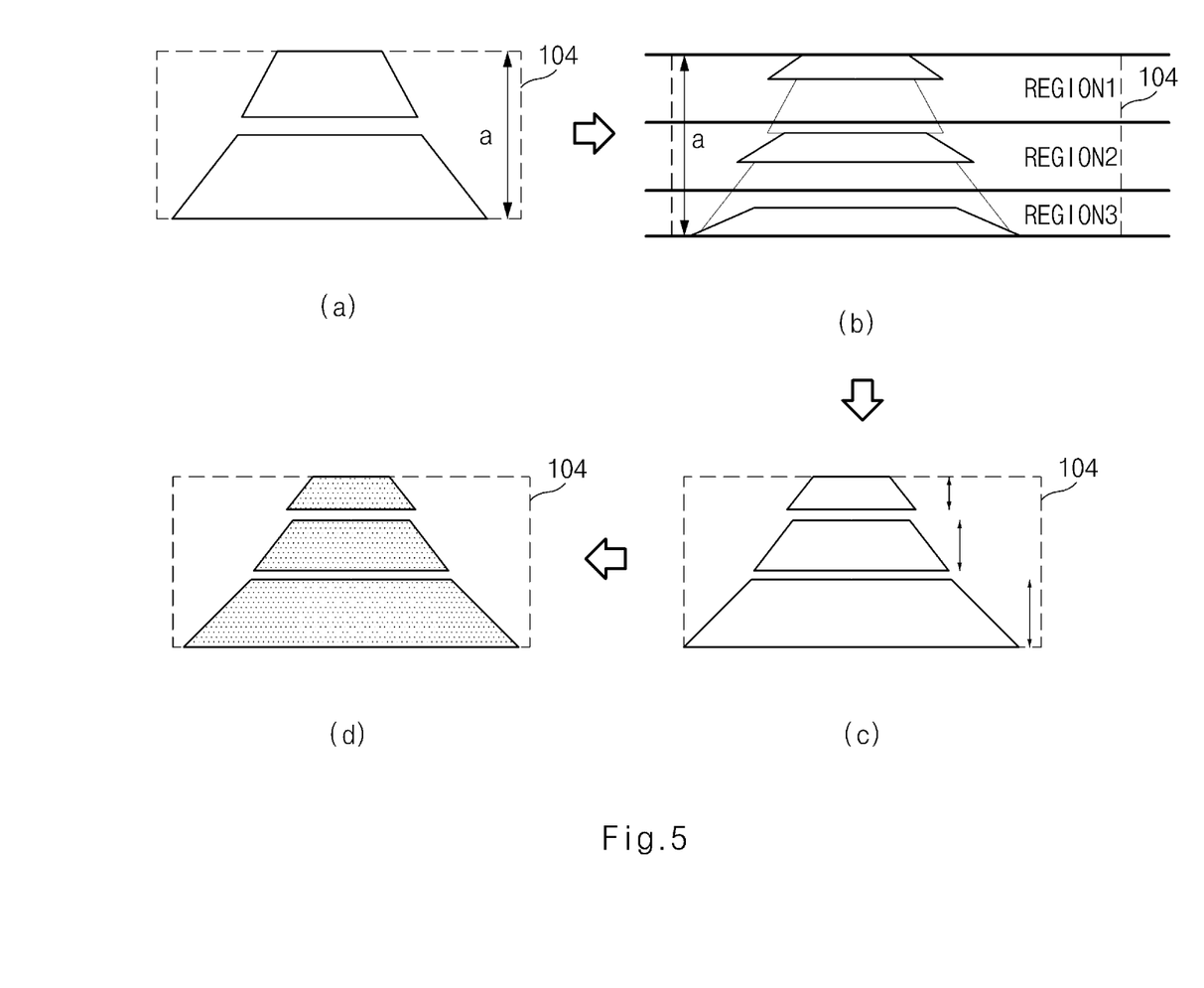
FIG. 5 is an illustrative view showing a process of scaling the set inter-vehicle distance display information according to embodiments of the present disclosure.
Figure 6:
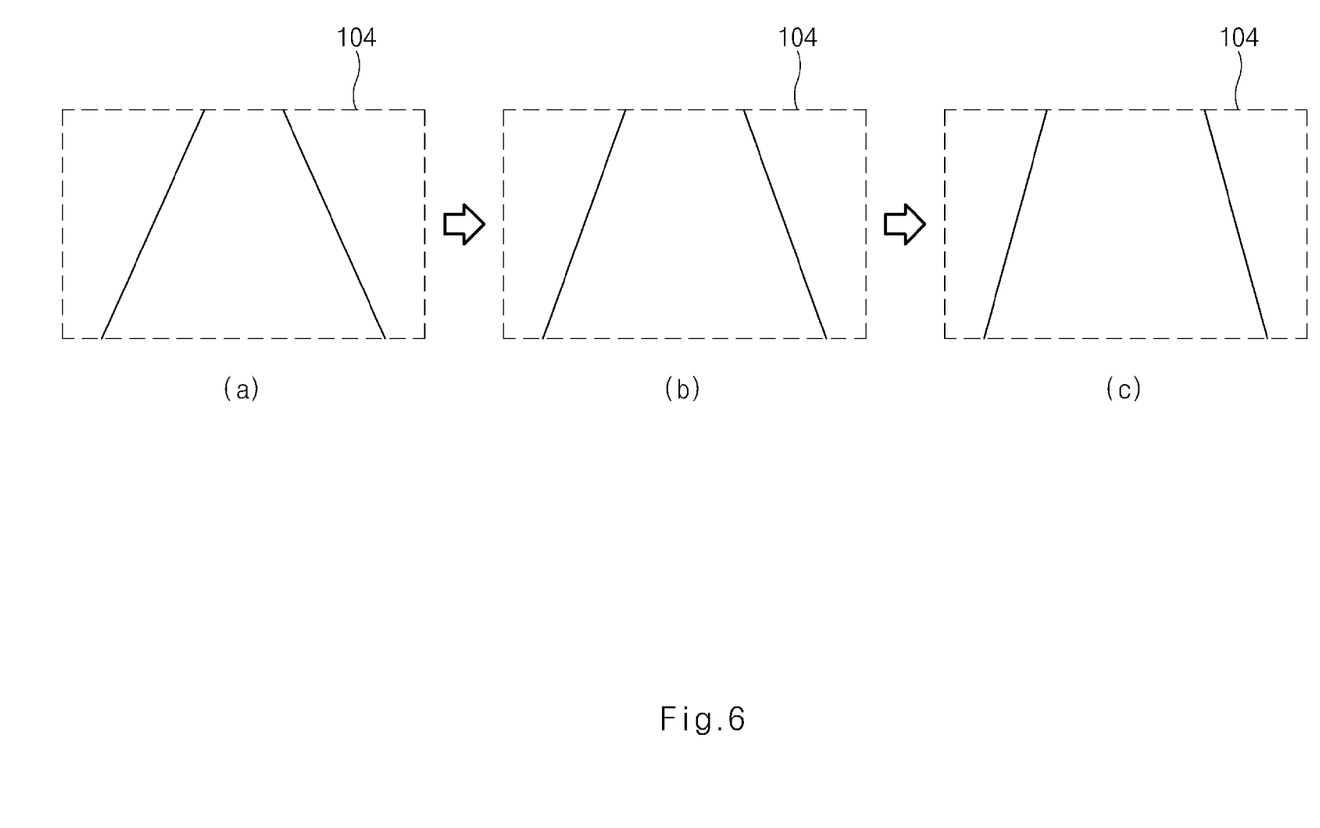
FIG. 6 is a diagram showing an example of processing perspective for the set inter-vehicle distance display information according to embodiments of the present disclosure.

FIG. 5 is an illustrative view showing a process of scaling the set inter-vehicle distance display information according to embodiments of the present disclosure, and FIG. 6 is a diagram showing an example of processing perspective for the set inter-vehicle distance display information according to embodiments of the present disclosure.

In the case in which the set inter-vehicle distance is three steps and the actual inter-vehicle distance is two steps, since the nearby vehicle is positioned within augmented reality display region, the region capable of displaying the set inter-vehicle distance is limited, such that the nearby vehicle may not be displayed by the default size of the set inter-vehicle distance display information (a). Therefore, the controller 30 detects a nearby vehicle region which is occupied by the nearby vehicle within the augmented reality display region using the front image which is photographed by the front camera 10, and extracts an information displayable region 104 except for the nearby vehicle region and a region displaying the nearby vehicle indication information in the augmented reality display region.

In addition, the controller 30 scales the set inter-vehicle distance display information based on a size (e.g., a vertical length a) of the information displayable region 104 (e.g., b-c). For example, if the vertical length of the information displayable region is a, the controller 30 scales a height of a trapezoidal figure to, e.g., a×0.33.

Next, if the distance between the nearby vehicle and the driver's own vehicle is substantially equal to (i.e., matched within an error range) to the set inter-vehicle distance by the smart cruise control system 60, the controller 30 changes a display form and scheme of the set inter-vehicle distance display information. For example, the controller 30 changes color of the set inter-vehicle distance display information (d).

Here, the controller 30 continuously scales the set inter-vehicle distance display information as the distance between the nearby vehicle and the own vehicle is changed. A case in which the set inter-vehicle distance is one step and the nearby vehicle gets out of the augmented reality display region will be described with reference to FIG. 6, by way of example.

In the case in which the nearby vehicle is outside of the augmented reality display region, and the driving velocity of the nearby vehicle is less than the set driving velocity of the own vehicle, the controller 30 processes the perspective information by adjusting a hypotenuse gradient of the trapezoidal figure constituting the set inter-vehicle distance display information.

In this case, the controller 30 adjusts the hypotenuse gradient of the trapezoidal figure depending on the distance between the nearby vehicle and the own vehicle. For example, the controller 30 extracts a horizontal width (e.g., vehicle width) of the nearby vehicle from the front image and determines the extracted horizontal width as a top side length of the trapezoidal figure in a state in which a length of a lower base of the trapezoidal figure is fixed. Therefore, as the distance between the own vehicle and the nearby vehicle decreases, since the hypotenuse gradient of the trapezoidal figure gradually increases, the driver may recognize that the nearby vehicle approaches the own vehicle.

The embodiments described above are those in which the components and features according to the present disclosure are coupled to each other in a predetermined form. The respective components or features should be considered being selective unless explicitly stated. The respective components or features may be implemented in a form in which they are not coupled to other components or features. It is also possible to configure the embodiments of the present disclosure by coupling some components and/or features. An order of operations described in the embodiments of the present disclosure may be changed. Some configurations or features of the embodiments may be included in other embodiments or may be exchanged with corresponding configurations or features in other embodiments. It will be apparent that the accompanying claims which do not have an explicit recitation relationship in the following claims are coupled to configure embodiments or may be included as new claims by an amendment after being filed.

The embodiments of the present disclosure may be implemented by various means, for example, hardware, firmware, software, or a combination thereof, or the like. In the implementation by hardware, embodiments embodiment of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the implementation by firmware or software, embodiments of the present disclosure may be implemented in forms such as modules, procedures, functions, or the like, that perform functions or operations described above. Software codes are stored in a memory unit and may be driven by a processor. The memory unit is disposed inside or outside the processor and may transmit and receive data to and from the processor by the well-known various means.

As described above, according to embodiments of the present disclosure, it is possible to provide convenience to the driver because the inter-vehicle distance information may be displayed on the limited augmented reality display region of the head-up display (HUD) to be highly recognizable during the smart cruise control.

It is apparent to those skilled in the art that the present disclosure may be embodied in other specific forms without departing from features of the present disclosure. Accordingly, the detail description as described above is not interpreted as being limited in all views, but is to be considered as being illustrative. The scope of the present disclosure should be determined by reasonable interpretation of the accompanying claims, and all modifications which fall in the equivalent scope of the present disclosure are included in the scope of the present disclosure.

What is claimed is:

1. An apparatus for displaying vehicle information, the apparatus comprising:
a front camera configured to photograph a front image of a vehicle;
an inter-vehicle distance detector configured to measure an inter-vehicle distance between the vehicle and a nearby vehicle;
a vehicle information detector configured to detect vehicle information associated with the vehicle;
a smart cruise control system configured to control a smart cruise control of the vehicle using the inter-vehicle distance and the vehicle information;
a display configured to display information relating to the smart cruise control in an augmented reality display region within a front image located in a front portion of the vehicle; and
a controller configured to: i) compare an actual inter-vehicle distance between the driver's own vehicle and a nearby vehicle, which is measured by the inter-vehicle distance detector, to a set inter-vehicle distance which is preset and ii) output display information corresponding to the set inter-vehicle distance to the display based on the comparison, wherein
when the display information cannot be displayed on the augmented reality display region because the actual inter-vehicle distance is less than the set inter-vehicle distance, the controller is further configured to: i) determine an information displayable region in the augmented reality display region that is capable of displaying the display information and ii) scale the display information based on a size of the information displayable region,
a region of the front image where a nearby vehicle region overlaps the augmented reality display region forms an overlapped region, and
the controller is further configured to calculate a vertical length of the information displayable region by subtracting a sum of i) a vertical length of the overlapped region and ii) a vertical length of a region in which nearby vehicle indication information is displayed, from a vertical length of the augmented reality display region.

2. The apparatus according to claim 1, wherein the controller is further configured to: i) extract the information displayable region in the augmented reality display region when the actual inter-vehicle distance is less than the set inter-vehicle distance and ii) display the display information in the extracted information displayable region.

3. The apparatus according to claim 2, wherein the controller is further configured to extract the information displayable region from the augmented reality display region using the front image except for a nearby vehicle region and a region displaying nearby vehicle indication information indicating the nearby vehicle.

4. The apparatus according to claim 1, wherein the controller is further configured to: i) check whether or not the nearby vehicle is outside of the augmented reality display region using the front image when the actual inter-vehicle distance is equal to or greater than the set inter-vehicle distance and ii) determine whether or not the display information is displayed based on a driving velocity of the nearby vehicle when the nearby vehicle is outside of the augmented reality display region.

5. The apparatus according to claim 4, wherein the controller is further configured to process perspective information for the display information based on a vehicle width of the nearby vehicle in the front image when the driving velocity of the nearby vehicle is slower than a set driving velocity.

6. The apparatus according to claim 4, wherein the controller is further configured to stop the outputting of the display information when the driving velocity of the nearby vehicle is greater than a set driving velocity.

* * * * *